April 28, 1970   N. W. KESSLER ET AL   3,508,766
WELDED JOINT FOR PIPE HAVING INTERNAL COATING
Filed Oct. 25, 1968

INVENTORS
NEWLIN W. KESSLER
BY  ORVILLE C. BERG

John H. Gallagher
ATTORNEY

United States Patent Office 3,508,766
Patented Apr. 28, 1970

3,508,766
WELDED JOINT FOR PIPE HAVING INTERNAL COATING
Newlin W. Kessler, Oklahoma City, Okla., and Orville C. Berg, Edmonton, Alberta, Canada, assignors to American Machine & Foundry Company, New York, N.Y., a corporation of New Jersey
Filed Oct. 25, 1968, Ser. No. 770,532
Int. Cl. F16l 13/02
U.S. Cl. 285—21                                    9 Claims

ABSTRACT OF THE DISCLOSURE

A welded joint between belled ends of tubular members having internal surfaces coated with corrosion resistant material which is subject to damage by excessive heat. Joint includes internally coated sleeve disposed coaxially within belled ends and having heat retardant means thereabout to retard the flow of heat from the region of the weld. Ends of sleeve are sealed to inner surface of tubular members by a thermosetting or thermoplastic sealant applied while in the plastic state, and formed into seals during assembly of the joint by packer means on the sleeve. To prevent welding gasses from blowing through the packer means and the uncured sealant, an incomplete girth weld is made about the ends of the tubular members, thereby forming a vent to permit the escape of welding gasses. Subsequently, the vent is welded closed to provide a fluid tight corrosion resistant joint.

BACKGROUND OF THE INVENTION

Field of the invention

This invention pertains to a method for making a welded joint between ends of tubular members that have internal coatings of a corrosion resistant material which under customary welding practices would be subject to damage by excessive heat generated during the welding operation.

Description of the prior art

There are frequent requirements in the oil and gas industry, the chemical industry, and the food processing industry, for example, that a pipeline transport a fluid substance that is corrosive to the metal, usually steel, of which the pipe is made. To avoid corrosion damage to the pipeline, it is common practice to bond a corrosive resistant coating, or liner, to the inside surface of each length of pipe before the pipe lengths are joined to form the pipeline. Materials commonly used for the bonded coating include various epoxy base materials, polyethylene, polyvinylchloride, and other thermoplastic and thermosetting plastic materials. These materials provide good protective coating throughout the length of a section of pipe, but it has been found that it is not always as easy to provide a good and continuous protective coating throughout the joint region where pipe ends are joined together in a fluid tight joint. A variety of different types of corrosion resistant joints have been proposed and tried. It usually is found in practice that a welded joint comprised of a girth weld joining butting pipe ends is more economical than a threads-and-coupling joint comprised of an internally threaded coupling, or box, that engage the externally threaded ends of adjacent pipes. A great difficulty encountered in making a welded joint with pipe having a corrosion resistant coating of the types mentioned above is that the heat produced during the welding operation melts, and/or burns and chars the plastic coating in the regions of the pipe ends that are subject to the high welding temperatures. This destroys the effectiveness of the coating to protect the pipeline from the corrosive influence of the material being transported through the pipeline.

A welded pipe joint which is intended to overcome the above difficulty is disclosed in U.S. Patent 3,266,820 issued to Leborgne et al. on Aug. 16, 1966. In this joint, the corrosion resistant coating is removed from the inside surfaces of adjacent pipe ends, one pipe end is enlarged in diameter, i.e., is belled, an asbestos sleeve is inserted within the end of the other unbelled pipe, and the unbelled pipe end then is inserted within the belled end of the first pipe and an external lap weld is made about the pipes. This type of joint has been found to be useful for some purposes, but it has the disadvantages that the asbestos sleeve sometimes breaks or cracks during the makeup of the joint, and the asbestos tends to soften and is washed out by the action of the fluid material flowing through the pipeline.

In the above-mentioned Leborgne et al. patent it is stated that it had been proposed to provide a joint comprised of two belled pipe ends and an internal sleeve of steel which has an internal protective coating. The patent also mentions that some form of heat shield is provided in the region of the weld. The patentees state, however, that this type of arrangement is expensive and involves complications in the execution of the work.

BRIEF SUMMARY OF THE INVENTION

The welded joint resulting from the practice of the present invention includes butting belled pipe ends that are welded together over an internal metal sleeve which has heat retardant material located in the region of the weld and an internal coating of corrosion resistant material. A corrosion resistant sealant material which is applied while in the plastic state secures the ends of the sleeve to the respective belled pipe ends and provides a continuous corrosion resistant coating throughout the joint. Packing means, such as O-rings, are located adjacent the tapered ends of the sleeve and serve several diverse functions, one of which is to prevent welding gasses from blowing out the sealant before it hardens or cures. In accordance with the method of this invention, an incomplete girth weld is made around the abutting belled ends of the pipes to allow welding gasses to escape from the region between the internal sleeve and the inner surfaces of the pipe ends, thereby assuring that the gasses do not rupture the seal provided by the O-rings and sealant material. The weld later is completed after the gas has escaped and after much of the heat has been dissipated from the region of the first incomplete weld.

DETAILED DESCRIPTION OF THE INVENTION

Figure 1:
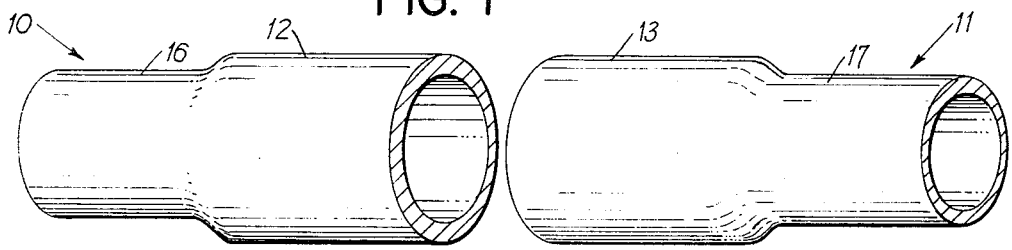
FIG. 1 is a perspective view of adjacent ends of two pipe sections to be joined, and showing the ends enlarged, or belled.

The initial step in forming a joint in accordance with the invention is to enlarge, or bell, both ends of each section of tubular member that is to be included in the pipeline. For the purpose of an example in describing the present invention it will be assumed that the tubular members are steel pipes that commonly are used in making pipelines that carry natural gas and/or oil, petrochemical fluid products, or other fluid products that are used in the recovery or refining of the above-named products. As illustrated in FIG. 1, the uncoated pipes 10 and 11 are belled at their adjacent ends 12 and 13 so that the inner diameters of the belled ends are approximately equal to the outer diameters of the unenlarged portions 16 and 17 of the respective pipes. The bells are formed so that the inner diameter of each belled portion is constant for a length of about two inches from its respective end, and then the diameter decreases to the standard diameter of the pipe over a length of approximately three-quarters of an inch. This belling of the uncoated pipe end is a relatively economical operation that is performed by a number of pipe manufacturers and steel fabricating plants.

The pipe sections, all with both ends belled in the manner illustrated in FIG. 1, then are internally coated with a corrosion resistant material. Many different coating materials are known and are commonly used. The particular material chosen and the thickness of the coating will depend on the particular fluid to be transported through the pipeline and upon other environmental conditions to be encountered. Many of the coating materials are thermosetting plastics having an epoxy base and others are thermoplastic synthetic resins. A variety of types of corrosion resistant coatings can be applied to tubular objects by AMF Tuboscope, Inc., Houston, Tex.

Figure 2:
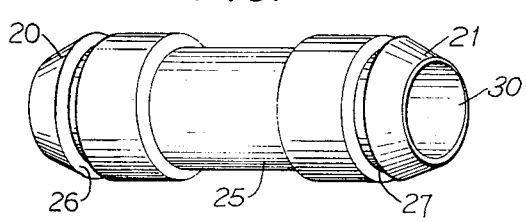
FIG. 2 is a perspective view of a machined sleeve that is to be inserted within the adjacent belled ends of two pipe sections.

FIG. 2 is an illustration of a tubular sleeve which is to be inserted within the belled ends of pipes 10 and 11 of FIG. 1. Sleeve 19 is machined from a length of the same stock of pipe as that of pipes 10 and 11 so that the inner diameter of sleeve 19 is the same as that of the unbelled portions 16 and 17 of pipes 10 and 11. The tubular sleeve is machined down to a reduced thickness throughout its length, and tapers 20 and 21 are imparted to its respected ends. An axially extending circumferential slot 25 is cut into the central or intermediate region of the sleeve and the narrow circumferential grooves 26 and 27 are cut into the body of the sleeve adjacent the respective tapers 20 and 21.

Figure 3:
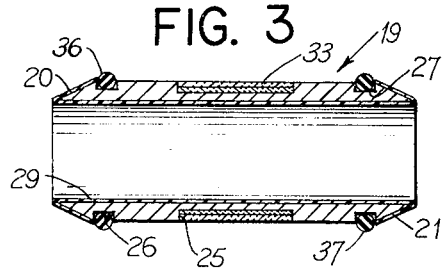
FIG. 3 is a cross sectional view of the sleeve of FIG. 2 after the sleeve has been internally coated with a corrosion resistant material and otherwise prepared for insertion within the ends of pipes.

A corrosion resistant coating 29, FIG. 3, then is applied to the inner surface 30 of sleeve 19. The coating also extends continuously around each of the ends of the sleeve and covers the tapered ends 20 and 21. The coating terminates at the respective grooves 26 and 27. This corrosion resistant coating on sleeve 19 may be of the same material, and be of the same thickness, as that applied to the interior of pipes 10 and 11, although it need not be so long as it will provide the required protection in the intended environment. The coating on sleeve 19 may be applied at the same coating plant where pipes 10 and 11 are coated.

After the coating 29 has been applied and properly cured, a thin ribbon of asbestos material 33 is wrapped within the circumferential slot 25 in sleeve 19 and secured therein by appropriate means to keep it in place. We have successfully used the commercially available asbestos material commonly called "plumbers asbestos." Other types of nonflammable, heat retardant material may be used as the wrapping in slot 25 so long as it will perform as a heat retarder in the intended manner. For example, pressure sensitive Fiberglas welding tape also may be used.

O-rings 36 and 37 are seated within slots 26 and 27 in sleeve 19. The O-rings are made of rubber or some other elastomeric material and serve several functions, as will be more fully discussed below.

The method of assembling and welding the joint of this invention now will be described. Pipe sections 10 and 11 are supported in axially aligned relationship with a spacing of at least several feet between the adjacent belled ends 12 and 13. A thin coating of a corrosion resistant adhesive sealant in a pasty or tacky form, i.e., in the plastic state, then is smeared throughout the interior and into the shoulder areas of the belled portions 12 and 13 of pipes 10 and 11. The adhesive sealant also may be applied to the tapered ends 20 and 21 of sleeve 19, although this may not be absolutely necessary. The sealant may be an epoxy base adhesive that is capable of withstanding the environmental conditions to be encountered. We have successfully used the material Humbleweld #7501, a product of Humble Oil and Refining Co., Houston, Tex., and also have successfully used the material TK-21C, a product of AMF Tuboscope, Inc., Houston, Tex. Loose, short lengths of asbestos fibers were mixed with the latter product to give it a thicker consistency.

An end of sleeve 19, tapered end 20 for example is inserted coaxially within the belled end 12 of pipe 10. As the resilient O-ring 36 enters the pipe it has a wiping action along the interior surface of belled end 12 which serves the purpose smoothing and spreading the pasty or tacky adhesive sealant and removing air bubbles that may have been entrapped in the sealant. As O-ring 36 moves further into belled end 12 it wipes or pushes ahead of it excess adhesive sealant material, and after sleeve 19 is seated in its innermost position, FIG. 4, the excess sealant material completely fills and seals the clearance space between tapered end 20 and the adjacent interior coated surface of pipe 10, this seal being designated by the numeral 40 in FIG. 4. O-ring 36 also serves as a fluid tight seal, or packer, between sleeve 19 and the interior coated surface of pipe 10.

Figure 4:
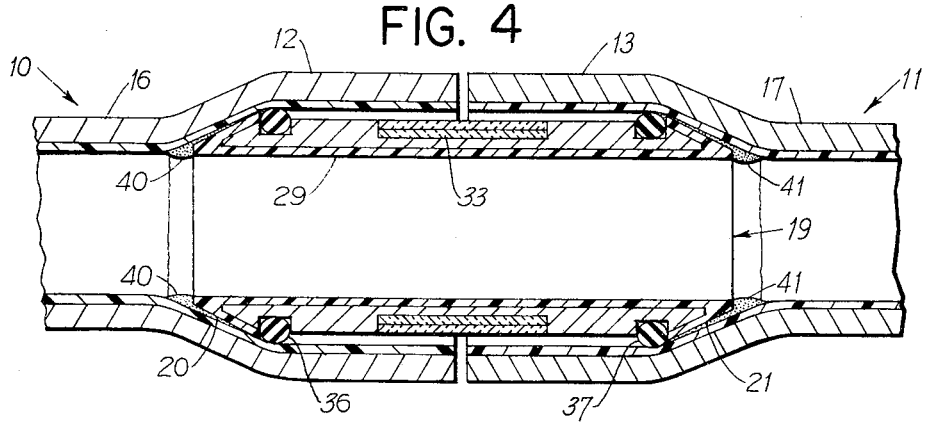
FIG. 4 is a cross sectional view of a pipe joint assembled in accordance with the teachings of the present invention; and, FIGS. 5 and 6 are perspective views of a pipe joint made in accordance with this invention just prior to completion, and after completion, respectively.

The belled end 13 of pipe section 11 then is slid over the tapered end 21 of sleeve 19 and is pushed to the left, as viewed in FIG. 4, until the right end of the sleeve is seated in its innermost position within the belled end 13. In the same manner as previously described, O-ring 37 acts as a wiper to push the excess sealant into the clearance space between tapered end 21 of sleeve 19 and the end of the shoulder portion of belled end 13, thereby forming the seal indicated at 41. The proper amount of adhesive sealant to be applied to the belled ends of the pipes and to the tapered ends of the sleeve will be learned from practice. The seals must be continuous and the sealant material should not protrude too far into the interior of the pipe, it being desired to provide a smooth and obstruction-free coated internal surface throughout the region of the joint.

It will be seen in FIG. 4 that the belled ends 12 and 13 now are in position to be welded together with a girth weld, and the asbestos material 33 is in position directly under the pipe ends where the weld will be made. Asbestos material 33 will retard the flow of heat generated during the weld and thereby will minimize the possibility of burning and damaging the interior coating 29 in sleeve 19. It also is desirable to leave a slight void space between the asbestos material 33 and the internal surface of the pipe ends. The void space also serves as a heat retarder to retard the flow of heat to the coated surface 29 in sleeve 19.

Figure 5:
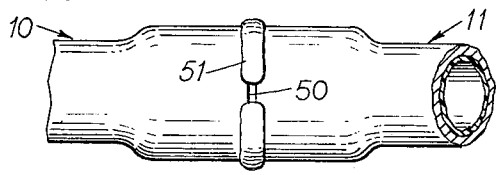

We have found that a special welding procedure must be used in making the girth weld around the pipe ends. If a complete 360° girth weld is made in one welding pass around the pipe ends, the considerable amount of welding gasses which are generated both in electric and gas welding will be trapped between sleeve 19 and the interior of the belled ends 12 and 13. It was found that under these conditions the welding gasses, which are under considerable pressure, blew past the O-rings 36 and 37 and blew out, or through, the sealant material, which has not yet hardened, or cured, at this stage of the procedure. This of course, would destroy the seals at 40 and 41 and would destroy the continuous corrosion resistant coating in the joint so that fluid being transported through the joint could work its way between the sleeve and pipe ends and possibly past the O-rings and cause corrosive damage to the unprotected portion of the joint. It was found that this serious trouble could be completely avoided by making the first welding pass around the pipes an incomplete girth weld. That is, a void space 50, FIG. 5, preferably at the tops of the pipe ends, is left in the weld bead 51 during the first welding pass so that the considerable gas that is generated during the welding may escape through space 50 and prevent the build up of destructive gas pressure within the joint. Because the welding gasses are vented to the outside of the joint, they do no build up in pressure, and O-rings 36 and 37 are quite adequate to provide a seal that prevents the gasses from blowing through the ends of the sleeve 19 and rupturing the seals 40 and 41. It has been found that a space 50 of about one-quarter to one-half inch is sufficient to provide the vent or "blowhole" necessary to vent the welding gasses.

In making the first incomplete girth weld, it is desirable to begin the weld near the top and run a bead around one side and to the bottom of the pipe ends. The bead again is started near the top, leaving the space 50, and continuing around the other side of the pipes and closing the bead at the bottom.

O-rings 36 and 37 cannot by themselves be relied upon to provide a fluid tight seal between sleeve 19 and the interior of pipes 10 and 11. The inner dimensions of the belled ends 12 and 13 may vary somewhat from pipe to pipe because of the belling operation that is performed in the pipe mill, and the dimensions may be out of tolerance enough to prevent the O-rings from becoming completely effective seals in a pressurized pipeline. It is for this reason that the adhesive sealant is included to provide the additional seals 40 and 41. After the sealant cures and hardens, it also structurally supports sleeve 19 within the belled ends 12 and 13. The curing of the sealant is accelerated by the heat generated during the welding operation.

Figure 6:
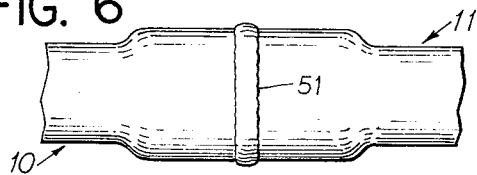

In practice, the welding crew now moves to the free end of the pipeline and makes the next joint in the same manner described above, again leaving a small void space or vent hole, in the next welding bead. The crew then returns to the previously made incomplete girth weld, which has now cooled and the welding gasses escaped, and the welding bead 51 is completed by closing the space 50, as illustrated in FIG. 6. The cooling of the weld and the regions adjacent thereto between the two welding operations also serves the purpose of limiting the temperature rise that will be experienced at the joint, thereby reducing the possibility of burning the plastic coating on the inside of sleeve 19. If an additional girth weld is required, as often is the case with pipe having thick walls, this additional weld now may be completed and there is no problem with welding gasses since the space between the two pipe ends already has been sealed.

The pipeline joint formed by the above-described method has a number of advantageous features. The joint provides a continuous corrosion resistant coating throughout the joint and the adjacent pipe ends due to the formation of seals 40 and 41, FIG. 4, and because the interior coating 29 in sleeve 19 is not damaged by the welding heat. The interior diameter of the pipeline is continuous and uniform, thereby minimizing turbulence in the flow of fluid through the line and optimizing the volume of flow achievable.

Because metal sleeve 19 is made from the same pipe stock as the pipe sections 10 and 11, the possibility of electrolytic action occurring between sleeve 19 and the interior walls of pipes 10 and 11 is minimized, thereby substantially eliminating any electrolytic corrosion that might occur if the metals were dissimilar. Furthermore, the metal sleeve 19 is structurally strong, can well withstand the considerable shear forces that exist at the joint both before and after welding, and also aids in maintaining the two pipe ends in axial alignment. The joint is more economical than a threads-and-coupling joint, and allows fast installation in deep trenches.

Although a metal tubular sleeve 19 made of the same material as the joined pipes presently is preferred, other material may be used so long as the sleeve is relatively nonfrangible during makeup of the joint and under shear forces, is chemically inert, electrolytically inactive, and can withstand the heat that is applied during welding of the pipe ends.

What is claimed is:
1. In a method of making a welded joint between belled ends of a pair of tubular members having internal corrosion resistant coatings to provide a uniform inner diameter and continuous corrosion resistant coatings throughout the joined tubular members, wherein said coatings are subject to damage by excessive heat generated during the welding of the tubular members, and wherein the inner diameters of said belled ends are substantially equal to the outer diameters of the unbelled portions of the tubular members, the steps of applying a corrosion resistant sealant in the plastic state to the inner surfaces of the belled ends of the tubular members, inserting into the belled end of one of the tubular members an internally coated sleeve having heat retardant means extending circumferentially about its center region, said sleeve being inserted to an axial position in which its inserted end is in sealing engagement with said corrosion resistant sealant and said center region of the sleeve is partially within said one tubular member, sliding the belled end of the other tubular member over the exposed end of said sleeve to an axial position in which the formerly exposed end is in sealing engagement with said corrosion resistant sealant and the end of said other tubular member is over said center region having the heat retardant means thereabout, incompletely welding the adjacent ends of the tubular members to leave a vent therebetween, whereby welding gasses may escape from the interior of said tubular members, allowing welding gasses to escape from said vent and permitting the region of the joint adjacent the weld to cool at least partially, and closing the vent to form a circumferential fluid tight seal about the adjacent ends of the tubular members.

2. A method of making a fluidtight corrosion resistant welded joint between belled ends of a pair of tubular members having corrosion resistant internal coatings which are subject to damage by excessive heat, comprising the steps of applying a corrosion resistant sealant in the plastic state to the inner surfaces of the belled ends of the tubular members, inserting into the belled end of one of the tubular members an internally coated tubular sleeve having nonflammable heat retardant means extending circumferentially about its center region and having packer means adjacent each end thereof, one of said packer means engaging the inner surface of said one belled end and wiping at least a portion of said sealant before it as the sleeve is inserted within said one tubular member, said sleeve being inserted to an axial position in which said center region of the sleeve is partially within said one tubular member, sliding the belled end of the other tubular member over the exposed end of said sleeve so that the packer means adjacent said exposed end engages the inner surface of the belled end of said other tubular member and wipes at least a portion of the applied sealant before it as the other tubular member is moved axially over the exposed end of the sleeve to a position where the belled end is over said central region having the heat retardant means thereabout, whereby said belled ends of the tubular members are axially aligned and adjacent each other over the central region of said sleeve, incompletely welding the adjacent ends of the tubular members to leave a vent between the ends whereby welding gasses may escape from the interior of said tubular members, allowing welding gasses to escape from said vent, and closing the vent to form a circumferential fluidtight seal about the adjacent ends of the tubular members.

3. A method of making a fluidtight corrosion resistant welded joint between belled ends of a pair of tubular members having corrosion resistant internal coatings which are subject to damage by excessive heat, comprising the steps of applying a corrosion resistant thermosetting or thermoplastic adhesive sealant in the plastic state to the inner surfaces of the belled ends of the tubular members, inserting coaxially into the belled end of one of the tubular members an internally coated tubular sleeve having nonflammable heat retardant means extending circumferentially about its center region and having adjacent each end thereof packer means one of which engages the inner surface of said one belled end and wipes at least a portion of said sealant before it as the sleeve is inserted within said one pipe end, said center region of the sleeve being partially within said one tubular member, pushing the belled end of the other tubular member over the exposed end of said sleeve so that the packer means adjacent said exposed end engages the inner surface of the belled end of said other tubular member and wipes at least a portion of the applied sealant before it as the other tubular member is moved axially over the exposed end of the sleeve to a position where its belled end is over said central region having the heat retardant means thereabout, whereby said belled ends of the tubular members are axially aligned and adjacent each other over the central region of said sleeve, welding an incomplete girth weld at the adjacent ends of the tubular members to leave a vent between the ends and allowing welding gasses to escape through the vent from the interior of said tubular members, allowing said weld and the regions adjacent thereto to cool at least partially, and completing the weld to form a continuous circumferential weld about adjacent ends of the tubular members.

4. In a method of making a welded joint between belled ends of a pair of metallic tubular members having internal corrosion resistant coatings to provide a uniform inner diameter and continuous corrosion resistant coating throughout the joined tubular members, wherein said coatings are subject to damage by excessive heat generated during the welding of the tubular members, and wherein the inner diameters of said belled ends are substantially equal to the outer diameters of the unbelled portions of the tubular members, the steps of applying a corrosion resistant sealant in the plastic state to the inner surfaces of the belled ends of the tubular member, inserting into the belled end of one of the tubular members an internally coated tubular metallic sleeve having packer means adjacent its respective tapered ends and having heat retardant means extending circumferentially about a region intermediate said packer means, said tubular sleeve having an inner diameter substantially equal to the inner diameters of the unbelled portions of said tubular members and being of a material metallurgically similar to that of the tubular members, one of said packer means engaging the inner surface of said one belled end and wiping at least a portion of said sealant before it as the sleeve is inserted within said one tubular member thereby causing said sealant to fill and seal the region between the adjacent tapered end of the sleeve and the inner surface of said one tubular member, said sleeve being inserted to an axial position in which said intermediate region of the sleeve is partially within said one tubular member, sliding the belled end of the other tubular member over the exposed end of said sleeve so that the packer means adjacent the other one of said tapered ends engages the inner surface of the belled end of said other tubular member and wipes at least a portion of the applied sealant before it as the other tubular member is moved axially over the exposed end of the sleeve, thereby to cause said sealant to fill and seal the region between the other one of said tapered ends and the adjacent inner surface of said other tubular member, said other tubular member being moved to an axial position in which its belled end is over said intermediate region, welding an incomplete girth weld about the adjacent ends of the tubular members to leave a vent therebetween so that welding gasses may escape from the region that is bounded by the sleeve, the packer means, and the inner surfaces of the belled portions of the tubular members, allowing welding gasses to escape from said bounded region and allowing the region of the joint adjacent the weld to cool at least partially, and completing the weld to form a continuous fluid tight girth weld about the adjacent ends of the tubular members.

5. A welded joint between ends of tubular members wherein said ends have enlarged internal diameters and wherein the enlarged ends are connected to the remaining portions of the members by respective transition regions having progressively changing inner diameters, said tubular members having an internal coating of a corrosion resistant material that is subject to damage by excessive heat transferred thereto during the welding of the members, said joint comprising a tubular sleeve disposed coaxially within respective enlarged ends of adjacent tubular members, said sleeve having a corrosion resistant internal surface and an internal diameter substantially equal to that of axially adjacent portions of said tubular members, said sleeve also having tapered ends which are disposed adjacent the respective regions of the tubular members where their diameters progressively change, a pair of elastomeric packer means respectively disposed adjacent the two tapered ends of the sleeve and extending radially between the sleeve and the inner surfaces of the respective tubular members to provide seals therebetween, heat retardant means disposed circumferentially about said sleeve in a region between the packer means, said heat retardant means being located under adjacent ends of the tubular members to retard the transfer of heat beyond said region during welding said ends, corrosion resistant sealant material providing fluid tight seals between the sleeve and the tubular members in the regions of the tapered ends of the sleeve, said internal coating of corrosion resistant material on the tubular members, said corrosion resistant internal surface of said sleeve, and said corrosion resistant sealant material providing a continuous corrosion resistant surface throughout the joint, and a continuous girth weld joining adjacent enlarged ends of said tubular members.

6. The combination claimed in claim 5 wherein, said sleeve with the heat retardant means thereabout has an external diameter smaller than the internal diameter of the coated enlarged ends of the tubular member, whereby a void space exists therebetween to retard the transfer of welding heat to said sleeve.

7. The combination claimed in claim 5 wherein, the sleeve and the tubular members are made of the same metallic material, whereby the possibility of electrolytic action therebetween is minimized.

8. The combination claimed in claim 5 wherein the corrosion resistant material between the sleeve and the tubular members is a thermosetting or a thermoplastic material which was applied in a plastic state to the interior surfaces of the enlarged ends of the tubular members before said sleeve was placed therein.

9. The combination claimed in claim 5 wherein said continuous girth weld is comprised of two different welds made during two separate welding operations.

References Cited

UNITED STATES PATENTS

| | | | |
|---|---|---|---|
| 2,014,612 | 9/1935 | Borton | 29—487 X |
| 2,762,904 | 9/1956 | Thomas | 285—370 X |
| 2,819,517 | 1/1958 | Pursell | 29—487 X |
| 3,266,820 | 8/1966 | Leborgne et al. | 285—21 |

FOREIGN PATENTS

| | | |
|---|---|---|
| 70,800 | 4/1942 | Czechoslovakia. |
| 795,605 | 1/1936 | France. |
| 883,048 | 2/1943 | France. |
| 1,431,797 | 2/1966 | France. |
| 875,743 | 5/1953 | Germany. |
| 1,022,510 | 3/1966 | Great Britain. |

DAVID J. WILLIAMOWSKY, Primary Examiner

D. W. AROLA, Assistant Examiner

U.S. Cl. X.R.

285—47, 55, 286, 370; 29—487